UNITED STATES PATENT OFFICE.

ALFRED A. WELLS, OF MONTCLAIR, NEW JERSEY, ASSIGNOR, BY MESNE ASSIGNMENTS, TO NATIONAL CARBON COMPANY, INC., OF CLEVELAND, OHIO, A CORPORATION OF NEW YORK.

POLYMERIZED MANGANESE-DIOXID DEPOLARIZER.

1,293,272. Specification of Letters Patent. Patented Feb. 4, 1919.

No Drawing. Application filed October 25, 1915. Serial No. 57,745.

*To all whom it may concern:*

Be it known that I, ALFRED A. WELLS, a citizen of the United States, and a resident of Montclair, in the county of Essex and State of New Jersey, have invented certain new and useful Improvements in Polymerized Manganese-Dioxid Depolarizers, of which the following is a specification.

This invention relates to a method of making manganese compounds suitable as depolarizers and relates particularly to manganese depolarizing material useful in dry batteries employed in pocket flash lights and the like.

My invention contemplates a process for the conversion of mineral manganese dioxid into artificial manganese dioxid or other higher oxids of manganese and the production of polymerized or cyclic manganese dioxid. Ordinary mineral manganese dioxid or pyrolusite is a very imperfect depolarizer and is used mainly in large batteries of the Leclanché type. In miniature pocket batteries it is lacking in effectiveness. The conversion of natural manganese dioxid into artificial dioxid ordinarily requires a series of operations which are costly and protracted. The present process enables the conversion to be carried out at a minimum of cost and with few operations.

For this purpose I may start with a medium or fairly good grade of manganese dioxid such as ground pyrolusite, mixing this with charcoal, coke or other carbonaceous agent and heating to a high temperature, as will be obtained for example by the electric furnace, to form the carbid of manganese compound such as trimanganese carbid, $Mn_3C$ being especially desirable. This compound is acted upon by moisture and gives manganese hydrate while iron present in the form of carbid does not react readily with water and the flocculent manganese hydrate $(MnO_2H_2)_3$ may be largely separated from iron carbid by various methods of mechanical separation. As the manganese hydrate which is formed is relatively light and is easily floated and as the undecomposed carbids present are relatively heavy the manganese hydrate may be separated in most cases quite effectively by floating and washing out with a stream of water, allowing the heavier particles to settle and eventually collecting the manganese hydrate which is in suspension. By varying the degree of such treatment the desired measure of purification may be obtained.

The manganous hydrate is then oxidized to a higher oxid, which may be done by exposing the aqueous suspension to a current of ozone, or air containing ozone which gives a desirable form of manganese dioxid which I am disposed to regard either as a polymerized product or as a cyclic manganese dioxid containing three manganese dioxid molecules joined in a ring. Whether a simple form of polymerization or a cyclic body is formed from a multiple of manganese dioxid molecules, such multiple unit apparently has a tendency on breaking down to afford the simple molecule in a nascent condition, as it were; which is useful in maintaining the depolarizing efficiency.

Or the manganese hydrate may be heated in air to a temperature above the boiling point of water, such for example as 150–250° C. or so, more particularly in a current of moist air or in a moist oxygen-containing gas so as to oxidize the hydrate to the higher oxid.

By the use of moist air at temperatures of 150° C. and upward oxidation of the hydrate to a cyclic higher oxid is seemingly favored. Dry air, on the other hand, only partially oxidizes the product requiring subsequent treatment with a solution of permanganate, etc., in order to complete the oxidation.

The reactions yielding the product set forth above may be expressed as follows:—

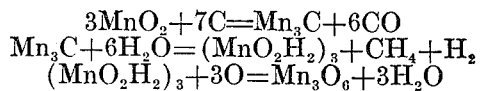

Such depolarizing agent as is obtained in any of the foregoing ways may be incorporated with graphite and formed into a depolarizing mass about an electrode of carbon, which may be introduced into an ordinary zinc container with an exciting fluid containing ammonium chlorid.

To recapitulate, the invention comprises the process of converting resistant natural manganese dioxid into artificial active higher oxid preferably of a polymerized or cyclic nature and preferably the tri-manganese dioxid, $Mn_3O_6$, highly active as a depolarizing agent.

What I claim is:—

1. The process of converting natural manganese dioxid into artificial active manganese dioxid which comprises transforming the natural dioxid into carbid, treating the carbid with water to form manganese hydrate and oxidizing the latter to at least the dioxid state.

2. The process of converting natural manganese dioxid into artificial active manganese dioxid which comprises transforming the natural dioxid into carbid, treating the carbid with water to form manganous hydrate and oxidizing the latter substantially to the dioxid state.

3. The process of converting natural manganese dioxid into artificial active manganese dioxid which comprises converting natural dioxid into carbid, treating the carbid with water to form manganous hydrate and exposing the latter to a current of heated moist air.

4. The process of converting natural manganese dioxid into artificial active manganese dioxid which comprises converting natural dioxid into carbid, treating the carbid with the elements of water to form manganous hydrate and exposing the latter to a heated moist atmosphere containing oxygen.

5. The process of converting natural manganese dioxid into artificial active manganese dioxid which comprises converting natural dioxid into carbid, treating the carbid with water to form manganous hydrate, in exposing the latter to an atmosphere containing oxygen at a temperature of upward of 150° C., thereby oxidizing to approximately the dioxid state.

6. In the process of making depolarizing material the step which comprises roasting manganous hydrate in an oxidizing atmosphere containing steam to convert it substantially to manganese dioxid.

ALFRED A. WELLS.